(12) United States Patent
Ahn

(10) Patent No.: US 10,481,726 B2
(45) Date of Patent: *Nov. 19, 2019

(54) DISPLAY DEVICE INCLUDING TOUCH SCREEN PANEL

(71) Applicant: Samsung Display Co., Ltd., Yongin-Si, Gyeonggi-Do (KR)

(72) Inventor: Hyeong Cheol Ahn, Seoul (KR)

(73) Assignee: SAMSUNG DISPLAY CO., LTD. (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/173,896

(22) Filed: Oct. 29, 2018

(65) Prior Publication Data

US 2019/0064995 A1   Feb. 28, 2019

Related U.S. Application Data

(63) Continuation of application No. 14/710,280, filed on May 12, 2015, now Pat. No. 10,114,498.

(30) Foreign Application Priority Data

Nov. 21, 2014  (KR) .................. 10-2014-0163789

(51) Int. Cl.
  *G06F 3/041* (2006.01)
  *G09G 3/20* (2006.01)

(52) U.S. Cl.
  CPC ............ *G06F 3/0416* (2013.01); *G06F 3/041* (2013.01); *G09G 3/20* (2013.01); *G09G 2380/02* (2013.01)

(58) Field of Classification Search
  CPC .................. G06F 3/0416; G06F 3/041
  See application file for complete search history.

(56) References Cited

U.S. PATENT DOCUMENTS 10,114,498 B2 * 10/2018 Ahn ............... G06F 3/0416
2007/0069648 A1    3/2007 Kim et al.
2009/0322214 A1   12/2009 Lee et al.
(Continued)

FOREIGN PATENT DOCUMENTS

CN           1937141 A     3/2007
CN         101615610 A    12/2009
(Continued)

*Primary Examiner* — Kent W Chang
*Assistant Examiner* — Chayce R Bibbee
(74) *Attorney, Agent, or Firm* — Innovation Counsel LLP

(57) ABSTRACT

A display device with reduced chance of pad unit corrosion is presented. The display device includes: a display panel configured to display an image, the display panel including a first pad unit; a touch screen panel (TSP) attached to an upper portion of the display panel, the touch screen panel including a second pad unit; a TSP flexible printed circuit board configured to include one end that is connected to the second pad unit of the touch screen panel; a window substrate configured to cover the touch screen panel; and a TSP adhesive layer interposed between the touch screen panel and the window substrate to adhere the window substrate to the touch screen panel, wherein the TSP adhesive layer is formed such that the TSP adhesive layer at least partially covers a TSP connection part the TSP flexible printed circuit board is connected to the second pad unit of the touch screen panel.

20 Claims, 10 Drawing Sheets

(56) References Cited

U.S. PATENT DOCUMENTS

| | | |
|---|---|---|
| 2010/0309150 A1 | 12/2010 | Lee et al. |
| 2012/0113356 A1 | 5/2012 | Yu et al. |
| 2013/0147742 A1 | 6/2013 | Lee |
| 2013/0277094 A1 | 10/2013 | Lee |
| 2013/0319835 A1 | 12/2013 | Cho |
| 2014/0138131 A1 | 5/2014 | Hao et al. |
| 2016/0147361 A1 | 5/2016 | Ahn |

FOREIGN PATENT DOCUMENTS

| | | |
|---|---|---|
| KR | 1020100094088 A | 8/2010 |
| KR | 1020120039854 A | 4/2012 |
| KR | 1020130118083 A | 10/2013 |
| KR | 1020140122879 A | 10/2014 |

* cited by examiner

DISPLAY DEVICE INCLUDING TOUCH SCREEN PANEL

RELATED APPLICATIONS

This application is a continuation application of U.S. patent application Ser. No. 14/710,280 filed on May 12, 2015, which claims priority to and the benefit of Korean Patent Application No. 10-2014-0163789 filed in the Korean Intellectual Property Office on Nov. 21, 2014, the entire contents of which are incorporated herein by reference.

BACKGROUND

1. Field

The described technology relates generally to a display device, and more particularly, to a display device including a touch screen panel.

2. Description of the Related Art

A touch screen panel (TSP) often incorporates an input function, so as to replace the need for a mouse or a keyboard, allowing a user to directly input information to a screen by using a finger or a pen. Since the touch screen panel enables users to directly perform desired operations while watching the screen and provides easy manipulation, the touch screen panel has been assessed as an ideal input type device for use in a graphic user interface (GUI) environment. Currently, the touch screen panel is widely used in various fields such as mobile phones, tablets, control screens of various medical devices, information displays for guides to banks, government offices, tourist service offices, and the like. The touch screen panel is used by being coupled to a display device such as a liquid crystal display or an organic light emitting diode display.

The liquid crystal display includes a liquid crystal panel in which a liquid crystal is injected into a space formed between an upper substrate and a lower substrate, a polarizer disposed at opposite sides of the liquid crystal panel to polarize light, and a light source and a light guide for supplying a predetermined amount of light to the liquid crystal panel, and serves to display image signals inputted from the outside.

An organic light emitting diode display includes two electrodes and an organic emission layer positioned therebetween, an electron injected from one electrode that is a cathode and a hole injected from another electrode that is an anode are coupled with each other in the organic emission layer to generate an exciton, and the exciton emits energy to emit light. The organic light emitting diode display has a self-luminous characteristic, and since it does not need a separate light source, unlike a liquid crystal display, it can have a relatively small thickness and weight. In addition, since the organic light emitting diode display exhibits high-quality characteristics such as low power consumption, high luminance, high response speed, etc., it is receiving much attention as a display device.

Recently, organic light emitting diode display has been developed as a flexible display device and a stretchable display device by using a substrate made of a flexible or stretchable material such as plastic or foil, which can easily accomplish a large-area, thin, and lightweight display.

Further, the liquid crystal display has been developed as a curved display device or a flexible display device.

When the flexible display device is manufactured, a touch screen panel and a window substrate attached to a display panel as well as the display panel are required to be bendable together. In this case, moisture or saline may penetrate into an empty space between the touch screen panel and the window substrate, thereby corroding a connection part of a TSP flexible printed circuit board connected to an edge pad unit of the touch screen panel.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a display device having advantages of being capable of preventing corrosion of a pad unit of a touch screen panel (TSP) by protecting a connection part of a TSP flexible printed circuit board connected to an electrode of the touch screen panel even when moisture or saline penetrates into an empty space of an edge thereof.

Further, the present embodiments has been made in an effort to provide a display device having advantages of being capable of preventing corrosion of a pad unit of a display panel by protecting a connection part of a display panel flexible printed circuit board connected to an electrode of the display panel even when moisture or saline penetrates into an empty space thereof.

An exemplary embodiment provides a display device including: a display panel configured to display an image, the display panel including a first pad unit, a touch screen panel attached to an upper portion of the display panel, the touch screen panel including a second pad unit, a TSP flexible printed circuit board configured to include one end that is connected to the second pad unit of the touch screen panel, a window substrate configured to cover the touch screen panel, and a TSP adhesive layer interposed between the touch screen panel and the window substrate to adhere the window substrate to the touch screen panel, wherein the TSP adhesive layer is formed such that the TSP adhesive layer at least partially covers a connection part at which the TSP flexible printed circuit board is connected to the second pad unit of the touch screen panel.

The connection part of the TSP flexible printed circuit board may be secured to the window substrate by the TSP adhesive layer.

The TSP adhesive layer may be formed to extend from a central portion facing a portion between the touch screen panel and the window substrate, to cover the connection part of the TSP flexible printed circuit board.

The TSP adhesive layer may be formed to extend from a central portion facing a portion between the touch screen panel and the window substrate, to cover the connection part of the TSP flexible printed circuit board.

The TSP adhesive layer may further include an auxiliary TSP adhering member having one surface at at least one of the connection part of the TSP flexible printed circuit board coupled to the second pad unit of the touch screen panel and the second pad unit, and another surface that is attached to the TSP adhesive layer.

The TSP adhesive layer may further include an auxiliary TSP adhering member having one surface at at least one of the connection part of the TSP flexible printed circuit board coupled to the second pad unit of the touch screen panel and the second pad unit, and another surface that is attached to the window substrate.

The TSP adhesive layer may be disposed to protrude from a boundary of an edge of the touch screen panel to cover a portion of the TSP flexible printed circuit board that is adjacent to the connection part.

The portion of the TSP flexible printed circuit board that is adjacent to the connection part may be secured to the window substrate by the TSP adhesive layer.

A touch driving integrated circuit may be mounted on the touch screen panel, and the TSP adhesive layer may be formed to cover the touch driving integrated circuit.

The TSP adhesive layer may be formed of an optically clear adhesive (OCA).

A reinforcement film may be interposed between the touch screen panel and the window substrate.

The TSP adhesive layer may be interposed between the reinforcement film and the window substrate to adhere the window substrate to the reinforcement film.

The reinforcement film may have an area that is smaller than that of the touch screen panel, a boundary of at least one side of the reinforcement film is positioned at an more inner side than a boundary of the touch screen panel, and the TSP flexible printed circuit board may be connected to an edge of the touch screen panel adjacent to the reinforcement film.

The TSP adhesive layer may be formed to extend over a boundary of the reinforcement film, to cover the connection part of the TSP flexible printed circuit board.

A reinforcement film adhesive layer may be interposed between the reinforcement film and the touch screen panel to attach the reinforcement film to the touch screen panel.

The display device may further include: a display panel flexible printed circuit board configured to include one end that is connected to the first pad unit, and a display panel adhesive layer interposed between the display panel and the touch screen panel to adhere the touch screen panel to the display panel, wherein the display panel adhesive layer is formed such that the display panel adhesive layer at least partially covers a connection part at which the display panel flexible printed circuit board is connected to the first pad unit of the display panel.

The connection part of the display panel flexible printed circuit board may be secured to the touch screen panel by the display panel adhesive layer.

The display panel adhesive layer may be formed to extend from a central portion facing a portion between the touch screen panel and the window substrate, to cover the connection part of the display panel flexible printed circuit board.

The display panel adhesive layer may further include an auxiliary display panel adhering member having one surface at at least one of the connection part of the display panel flexible printed circuit board coupled to the first pad unit of the display panel and the first pad unit, and another surface that is attached to the display panel adhesive layer.

The display panel adhesive layer may further include an auxiliary display panel adhering member having one surface at at least one of the connection part of the display panel flexible printed circuit board coupled to the first pad unit of the display panel and the first pad unit, and another surface that is attached to the touch screen panel.

A display driving integrated circuit may be mounted on the display panel, and the display panel adhesive layer may be formed to cover the display driving integrated circuit.

The display device may further include a desiccant that is coated according to a boundary at which an edge of the display panel contacts the display panel flexible printed circuit board.

The display device may further include a desiccant that is coated according to a boundary at which an edge of the touch screen panel contacts the TSP flexible printed circuit board.

The display panel may be a flexible display panel.

The display panel may be an organic light emitting diode panel.

According to the display device including the aforementioned touch screen panel, it is possible to prevent corrosion of a pad unit of a touch screen panel by protecting a connection part of a TSP flexible printed circuit board connected to an electrode of the touch screen panel even when moisture or saline penetrates into an empty space of an edge thereof.

Further, it is possible to strongly maintain connection of the TSP flexible printed circuit board at the pad unit of the touch screen panel even when the touch screen panel as well as the panel and the window are bent to accomplish a curved display panel or a flexible display panel.

In addition, it is possible to prevent corrosion of a pad unit of the display panel by including the structure which can protect a connection part of a display panel flexible printed circuit board that is connected to an electrode of the display panel even when moisture or saline penetrates into an empty space of an edge thereof.

DETAILED DESCRIPTION

Figure 1:
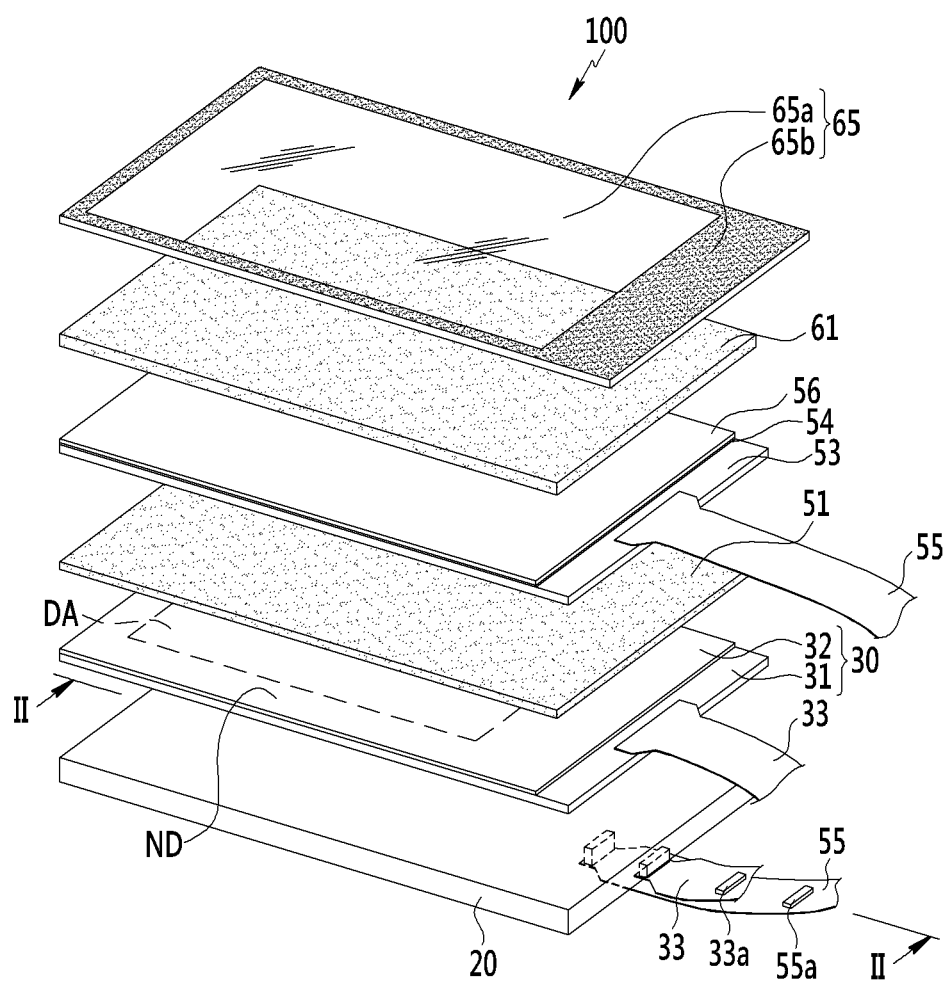
FIG. 1 is an exploded perspective view illustrating a display device according to an exemplary embodiment.

The present concept will be described more fully hereinafter with reference to the accompanying drawings, in which exemplary embodiments of the inventive concept are shown. As those skilled in the art would realize, the described embodiments may be modified in various ways without departing from the spirit or scope of the present inventive concept. The drawings and description are to be regarded as illustrative in nature and not restrictive. Like reference numerals designate like elements throughout the specification. In the drawings, size and thickness of each element are arbitrarily illustrated for convenience of description, and the present inventive concept is not necessarily limited to as illustrated in the drawings.

Further, when the first part is described as being arranged "on" the second part, this indicates that the first part is arranged at an upper side or a lower side of the second part without regard to the direction of Earth's gravitational force. Throughout this specification, unless explicitly described to the contrary, the word "comprise" and variations such as "comprises" or "comprising" will be understood to imply the inclusion of stated elements but not the exclusion of any other elements.

Hereinafter, a display device according to an exemplary embodiment will be described with reference to FIG. 1 and FIG. 2.

Figure 2:
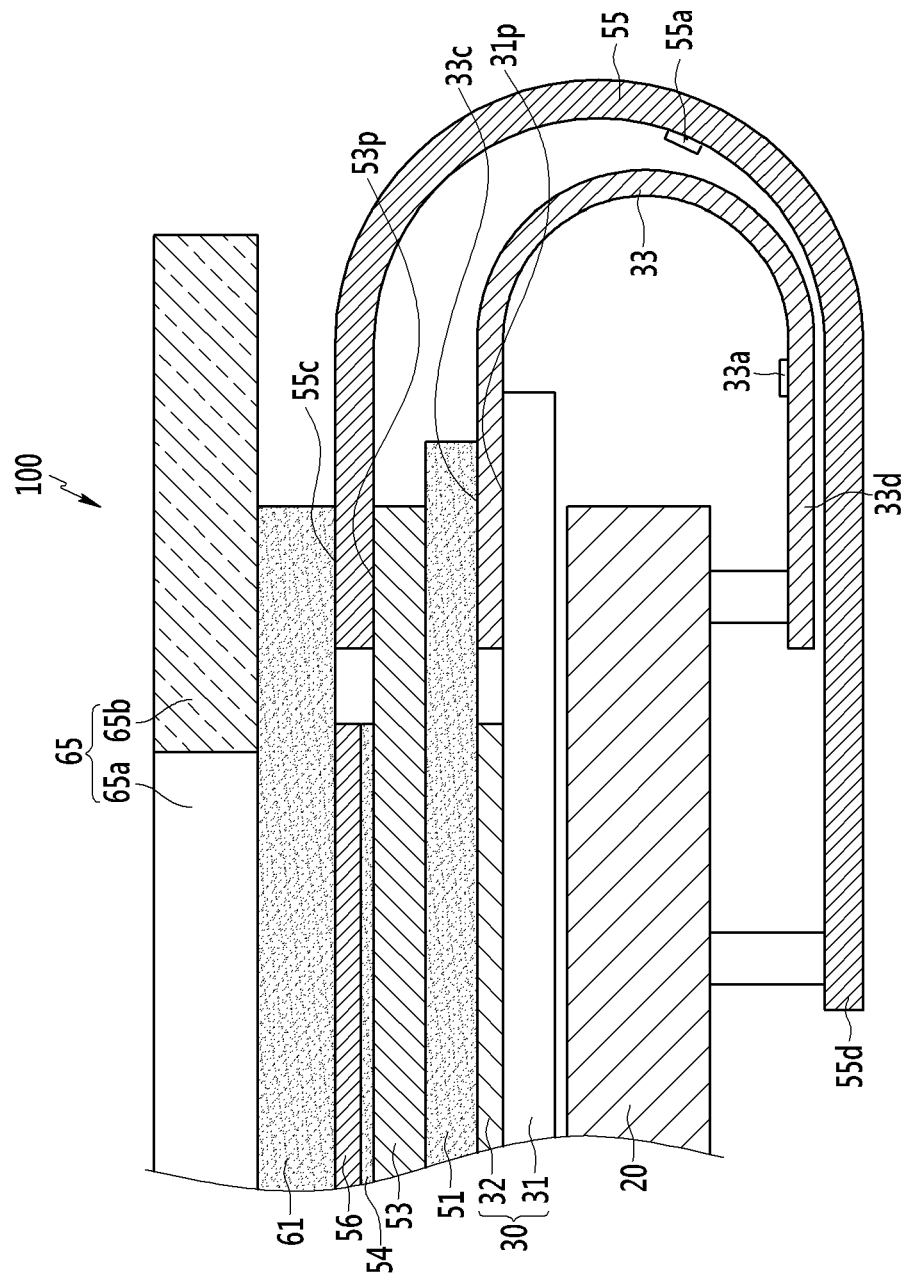
FIG. 2 is a cross-sectional view taken along the line of FIG. 1 illustrating an edge portion of the assembled display device shown in FIG. 1 at which a pad unit is disposed.

FIG. 1 is an exploded perspective view illustrating a display device according to an exemplary embodiment, and FIG. 2 is a cross-sectional view taken along the line of FIG. 1 illustrating an edge portion of the assembled display device shown in FIG. 1 at which a pad unit is disposed.

Referring to FIG. 1 and FIG. 2, in the display device 100 according to the present exemplary embodiment, a touch screen panel (TSP) 53 is attached to an upper portion of a display panel 31, and a window substrate 65 is attached to an upper portion of the touch screen panel 53 to cover the display panel 31 and the touch screen panel 53.

The display panel 31 is configured to display images by including a plurality of pixels arranged in a matrix form, and may be formed of an organic light emitting diode panel in the present exemplary embodiment. The display panel 31 may be formed of a flexible substrate to have a flexible characteristic, thereby accomplishing a curved, bendable, and foldable panel.

An optical film 32 may be attached on the display panel 31 to constitute a display panel assembly 30. Although not shown, the optical film 32 may include a polarization film and a phase difference film. The polarization film may serve to polarize incident light introduced into a side of the display panel 31 and reflective light of the incident light reflected in the display panel, and the phase difference film may be disposed to be more adjacent to the display panel than the polarization film to adjust phases of the incident light and the reflective light.

The display panel 31 includes a pad unit 31p (also referred to herein as "a first pad unit") at one edge, and terminal pads extending from wires of the display panel 31 are formed in the pad unit 31p. A display panel flexible printed circuit board (FPCB) 33 serves to connect the terminal pads of the pad unit 31p to a driving circuit unit of a driving circuit board 20 to transfer electrical signals that are required to drive the display panel 31 from the driving circuit unit thereto. For this purpose, a display connection part 33c of the display panel flexible printed circuit board 33 is connected to the pad unit 31p, and a first board connection part 33d thereof that is disposed to be opposite to the display connection part 33c is connected to the driving circuit unit of the driving circuit board 20. A display driving integrated circuit (IC) 33a may be mounted to generate driving signals in the display panel flexible printed circuit board 33 by using a chip on film (COF) method. The first board connection part 33d may be coupled to a connector element installed on the driving circuit board 20 and electrically connected to the driving circuit unit.

The driving circuit board 20 is disposed on one surface that is opposite to the window substrate 65 with reference to the display panel 31, and includes a driving circuit unit for driving the display panel 31 and the touch screen panel 53. For example, a timing controller (not shown) may be mounted in the driving circuit board 20 to generate control signals for controlling images implemented by the display panel 31, and the control signals may be transferred to the display driving integrated circuit 33a through the display panel flexible printed circuit board 33. Further, in the present exemplary embodiment, a plurality of electronic elements may be mounted in the driving circuit board 20 to control various functions of the display device 100. For example, a camera module, a speaker module, and a memory chip that are operated by being interlocked with the display panel 31 may be mounted.

The display panel flexible printed circuit board 33 may be bent to connect the pad unit 31p of the display panel 31 to the driving circuit unit of the driving circuit board 20. Specifically, the display panel flexible printed circuit board 33 includes a bendable portion between the display connection part 33c that is connected to the pad unit 31p of the display panel 31 and the first board connection part 33d that is connected to the driving circuit unit of the driving circuit board 20, and the bendable portion can be bent from the pad unit 31p toward the driving circuit board 20 in such a direction so as to be away from the window substrate 65.

The touch screen panel 53 is attached to an upper portion of the display panel 31. Since the optical film 32 is attached on the display panel 31, the touch screen panel 53 is disposed at an upper portion of the optical film 32. A display panel adhesive layer 51 is interposed between the optical film 32 and the touch screen panel 53 so that the touch screen panel 53 can be attached to the display panel 31. The display panel adhesive layer 51 may be formed of an optically clear adhesive (OCA), and may be applied as an adhesive tape or by coating and curing an adhesive material.

Referring to FIG. 2, in the present exemplary embodiment, the display panel adhesive layer 51 is formed such that the display panel flexible printed circuit board 33 covers a connection part that is connected to the pad unit 31p of the display panel 31. In this case, the connection part of the display panel flexible printed circuit board 33 corresponds to the display connection part 33c, and may be secured to the touch screen panel 53 by the display panel adhesive layer 51. The display panel adhesive layer 51 is formed to extend from a central portion facing a portion between the display panel 31 and the touch screen panel 53 to the connection part of the display panel flexible printed circuit board 33, so that the connection part of the display panel flexible printed circuit board 33 that is connected to the pad unit 31p of the display panel 31 can be attached and secured to the touch screen panel 53. The central portion may be defined as a portion close to a center of the planar area overlapping with the opposing the display panel 31 and the touch screen panel 53.

As a result, the display connection part 33c of the display panel flexible printed circuit board 33 can be attached to the display panel adhesive layer 51, and the pad unit 31p of the display panel 31 that is coupled to the display connection part 33c can be secured to the touch screen panel 53. Unlike the present exemplary embodiment, in the case that the pad unit 31p of the display panel 31 is not secured to the touch screen panel 53, the display panel flexible printed circuit board 33 which is bent tends to be unbent by an elastic force and the pad unit 33p of the display panel 31 has flexibility. Accordingly, stress may be continuously applied to the pad unit 33p which is bent toward the driving circuit board 20. However, as in the present exemplary embodiment, the pad unit 33p of the display panel 31 is secured to the touch screen panel 53. Accordingly, continuous stress can be prevented from being applied to the pad unit 33p according to undesired shape variation of the pad unit 33p, thereby preventing breakdown caused by signal wires formed in the pad unit 33p and stress of the terminal pads.

Further, the display panel adhesive layer 51 can be formed to extend in such a way so as to protect the connection part of the display panel flexible printed circuit board 33 connected to the electrode of the display panel 31, thereby preventing corrosion of the pad unit 31p of the display panel 31 even when moisture or saline penetrates from the outside into an empty space of an edge of the display panel 31.

When a touch is received from the outside, and the window substrate 65 is coupled to the upper portion of the touch screen panel 53, the touch screen panel 53 can sense a position of the touch made in the window substrate 65. In the present exemplary embodiment, the touch screen panel 53 may be formed of a panel that is driven as a capacitive type, but the present disclosure is not limited thereto. For example, the touch screen panel 53 may be formed of a panel that is driven as a resistive film type, an ultrasonic type, or an infrared type.

The window substrate 65 is formed to have an area that is larger than those of the display panel 31 and the touch screen panel 53 to cover the display panel 31 and the touch screen panel 53. The window substrate 65 includes a light transmitting portion 65a and a light blocking portion 65b. The light transmitting portion 65a is positioned to correspond to a display area DA of the display panel 31, and images implemented in the display panel 31 can be transmitted through the light transmitting portion 65a, thereby being visible to users. The light blocking portion 65b is positioned to surround the light transmitting portion 65a, and is positioned to correspond to a non-display area ND such that circuits and wires disposed around the display area DA are not exposed to the outside. As another example, the window substrate may be exclusively formed of a light blocking portion having an opening, and the light transmitting portion may be formed to have a shape corresponding to the opening.

The window substrate 65 is formed of an insulating material, and may be made of glass or plastic. In the case of the window substrate 65 formed of a flexible substrate made of plastic, the display device 100 may be flexible.

A reinforcement film 56 may be interposed between the touch screen panel 53 and the window substrate 65. A reinforcement film adhesive layer 54 is interposed between the reinforcement film 56 and the touch screen panel 53 so that the reinforcement film 56 can be attached to the touch screen panel 53. The reinforcement film 56 may be made of, e.g., polyethylene terephthalate (PET), but may be excluded from the configuration of the display device 100.

A TSP adhesive layer 61 is interposed between the touch screen panel 53 and the window substrate 65 so that the window substrate 65 can be attached to the touch screen panel 53. The TSP adhesive layer 61 may be formed of an optically clear adhesive (OCA), and may be applied as an adhesive tape or by coating and curing an adhesive material. In the case that the reinforcement film 56 is formed, the TSP adhesive layer 61 is attached on the reinforcement film 56.

However, in the case that the reinforcement film 56 is not formed, the TSP adhesive layer 61 directly contacts the touch screen panel 53 to be attached thereon.

The touch screen panel 53 includes a pad unit 53p (also referred to herein as "a second pad unit") at one edge, and terminal pads extending from wires of the touch screen panel 53 are formed in the pad unit 53p. A TSP flexible printed circuit board (FPCB) 55 serves to connect the terminal pads of the pad unit 53p to the driving circuit unit of the driving circuit board 20 from the driving circuit unit. For this purpose, a TSP connection part 55c of the TSP flexible printed circuit board 55 may be connected to the pad unit 53p, a second board connection part 55d thereof may be connected to the driving circuit unit of the driving circuit board 20, and a touch driving integrated circuit 55a may be mounted in the TSP flexible printed circuit board 55. The second board connection part 55d may be coupled to a connector element installed on the driving circuit board 20 and electrically connected to the driving circuit unit.

The TSP flexible printed circuit board 55 may be bent to connect the pad unit 53p of the touch screen panel 53 to the driving circuit unit of the driving circuit board 20. Specifically, the TSP flexible printed circuit board 55 includes a bendable portion between the TSP connection part 55c that is connected to the pad unit 53p of the touch screen panel 53 and the second board connection part 55d that is connected to the driving circuit unit of the driving circuit board 20, and the bendable portion can be bent from the pad unit 53p toward the driving circuit board 20 in such a direction so as to be away from the window substrate 65.

Referring to FIG. 2, in the present exemplary embodiment, the TSP adhesive layer 61 is formed such that the TSP flexible printed circuit board 55 covers a connection part that is connected to the pad unit 53p of the touch screen panel 53. In this case, the connection part of the TSP flexible printed circuit board 55 corresponds to the TSP connection part 55c, and may be secured to the window substrate 65 by the TSP adhesive layer 61. The TSP adhesive layer 61 is formed to extend from a central portion facing a portion between the touch screen panel 53 and the window substrate 65 to the connection part of TSP flexible printed circuit board 55, so that the connection part of the TSP flexible printed circuit board 55 that is connected to the pad unit 53p of the touch screen panel 53 can be attached and secured to the window substrate 65, thereby increasing peel-off strength of the TSP flexible printed circuit board 55. Accordingly, in the case that the reinforcement film 56 is formed, the TSP adhesive layer 61 may be formed to extend to the connection part of the TSP flexible printed circuit board 55 over the boundary of the reinforcement film 56. The central portion may be defined as a portion close to a center of the planar area overlapping with the opposing the touch screen panel 53 and the window substrate 65.

As a result, the TSP connection part 55c of the TSP flexible printed circuit board 55 may be adhered to the TSP adhesive layer 61, and thus the pad unit 53p of the touch screen panel 53 that is coupled to the TSP connection part 55c can be secured to the window substrate 65. Unlike the present exemplary embodiment, if the pad unit 53p of the touch screen panel 53 is not secured to the window substrate 65, the TSP flexible printed circuit board 55 which is bent "wants" to unbend itself by elastic force as the pad unit 53p of the touch screen panel 53 has flexibility. Accordingly, stress may have to be continuously applied to the pad unit 53p to keep it bent toward the driving circuit board 20. However, in the present exemplary embodiment, the pad unit 53p of the touch screen panel 53 is secured to the window substrate 65. Accordingly, continuous stress can be prevented from being applied to the pad unit 53p according to undesired shape variation of the pad unit 53p, thereby preventing breakdown caused by signal wires formed in the pad unit 53p and stress of the terminal pads.

Further, the TSP adhesive layer 61 can be formed to extend in such a way so as to protect the connection part of the TSP flexible printed circuit board 55 connected to the electrode of the touch screen panel 53, thereby preventing corrosion of the pad unit 53p of the touch screen panel 53 even when moisture or saline penetrates from the outside into an empty space of an edge of touch screen panel 53.

Figure 3:
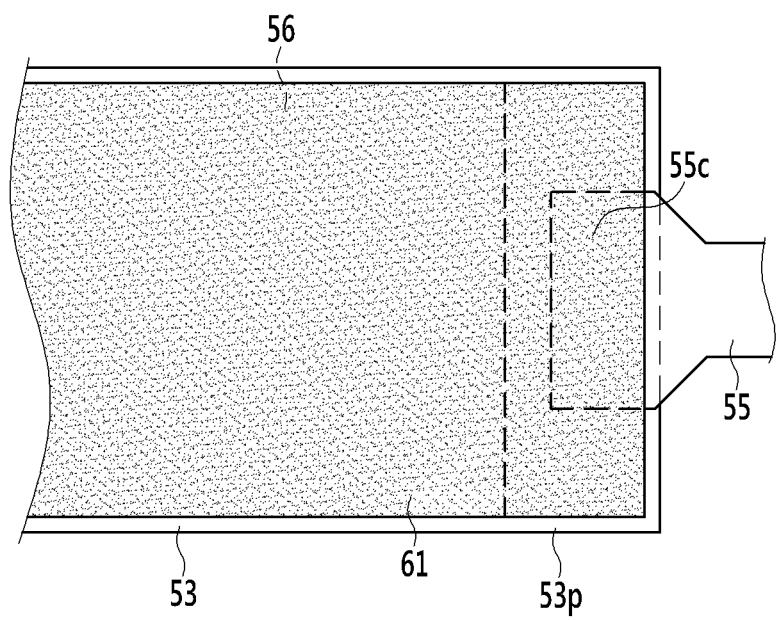
FIG. 3 is a top plan view illustrating how a TSP flexible printed circuit board is connected to a pad unit of a touch screen panel in a display device according to an exemplary embodiment.

FIG. 3 is a top plan view illustrating how a TSP flexible printed circuit board is connected to a pad unit of a touch screen panel in a display device according to an exemplary embodiment.

As shown in FIG. 3, the reinforcement film 56 is formed to have an area that is smaller than that of the touch screen panel 53 so that at least one boundary of the reinforcement film 56 may be positioned at an inner side from the boundary of the touch screen panel 53, and the TSP flexible printed circuit board 55 may be connected to the pad unit 53p to be adjacent to the reinforcement film 56 at the edge of the touch screen panel 53.

The TSP adhesive layer 61 is formed to have a shape and an area that are similar to those of the touch screen panel 53, and is formed to cover the TSP connection part 55c of the TSP flexible printed circuit board 55 over the boundary of the reinforcement film 56.

Figure 4:
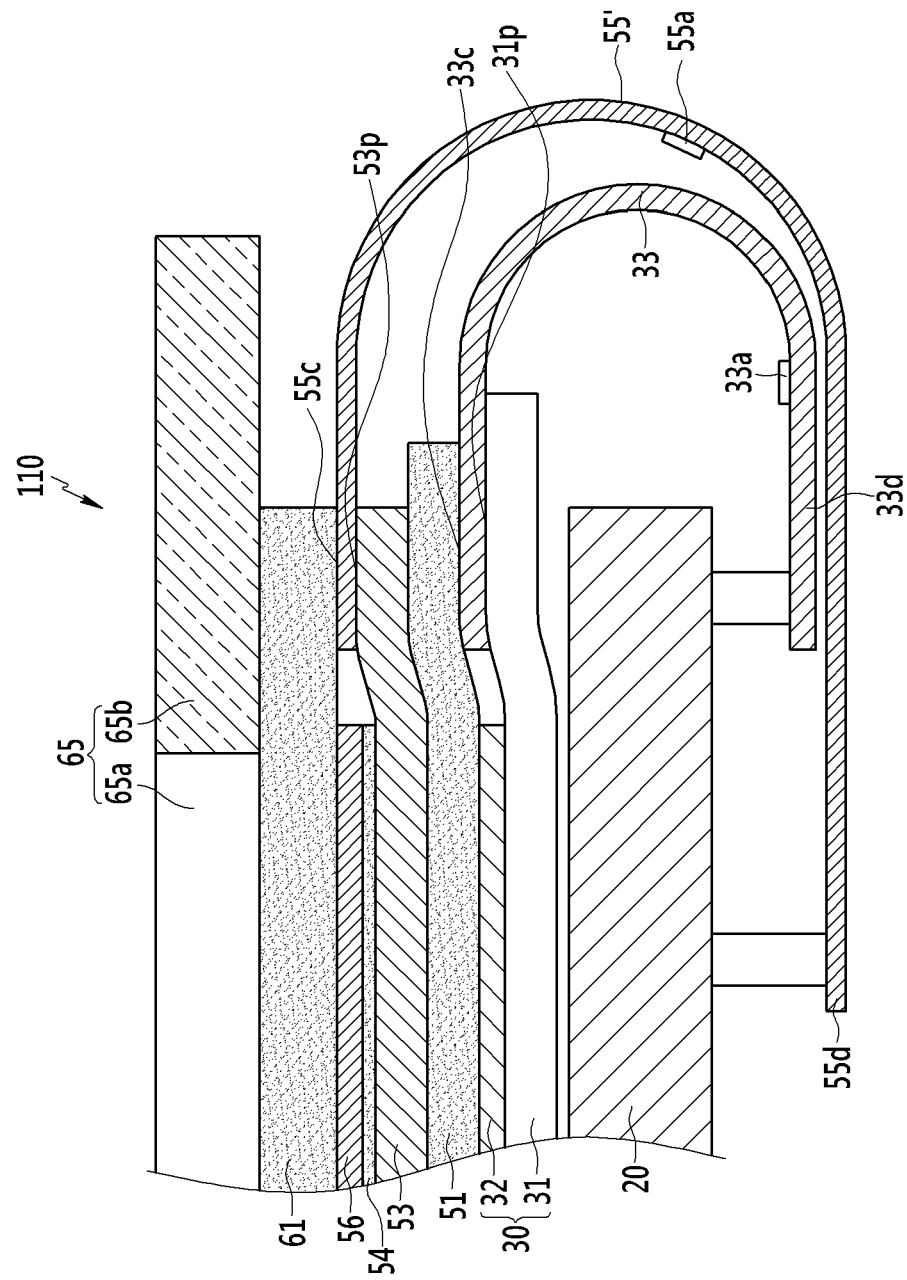
FIG. 4 is a cross-sectional view illustrating an edge portion of a display device at which a pad unit is disposed according to a modification of the exemplary embodiment.

FIG. 4 is a cross-sectional view illustrating an edge portion of a display device at which a pad unit is disposed according to a modification of the exemplary embodiment.

Referring to FIG. 4, in a display device 110 according to the present modification, a thickness of a TSP flexible printed circuit board 55' is smaller than the sum of thicknesses of the reinforcement film 56 and the reinforcement film adhesive layer 54, and the touch screen panel 53 and the display panel 31 are flexible, and thus the touch screen panel 53 and the display panel 31 can be formed such that each of the pad units 53p and 31p is partially formed to be bent toward the window substrate 65.

Further, if a thickness of the display panel flexible printed circuit board 33 is smaller than that of the optical film 32, the pad unit 31p of the display panel 31 can be formed to be partially bent toward the window substrate 65.

Figure 5:
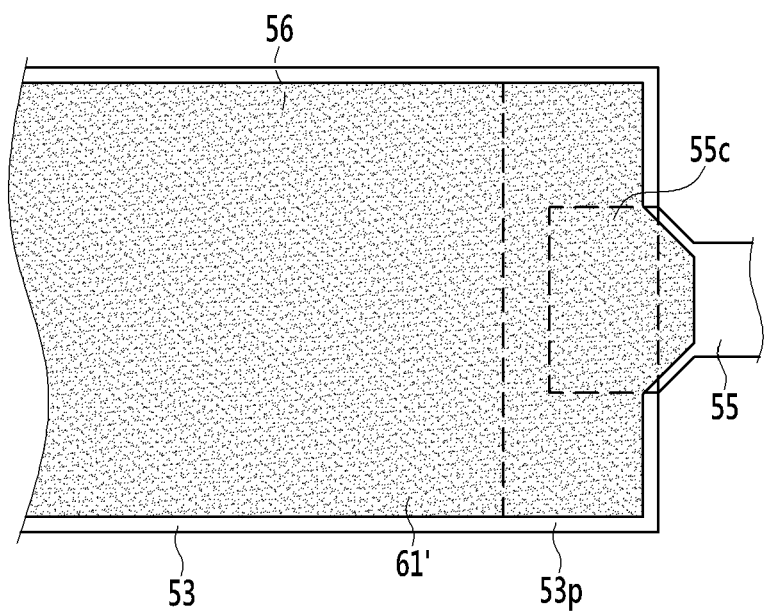
FIG. 5 is a top plan view illustrating how a TSP flexible printed circuit board is connected to a pad unit of a touch screen panel in a display device according to another modification of the exemplary embodiment.

FIG. 5 is a top plan view illustrating how a TSP flexible printed circuit board is connected to a pad unit of a touch screen panel in a display device according to another modification of the exemplary embodiment.

As shown in FIG. 5, in the present modification, a TSP adhesive layer 61' which covers the touch screen panel 53 and the connection part of the TSP flexible printed circuit board 55 connected to the pad unit 53p of the touch screen panel 53 can be formed to protrude from the boundary of the touch screen panel 53 so as to additionally cover a portion of the TSP flexible printed circuit board 55 connected to the connection part of the TSP flexible printed circuit board 55.

Figure 6:
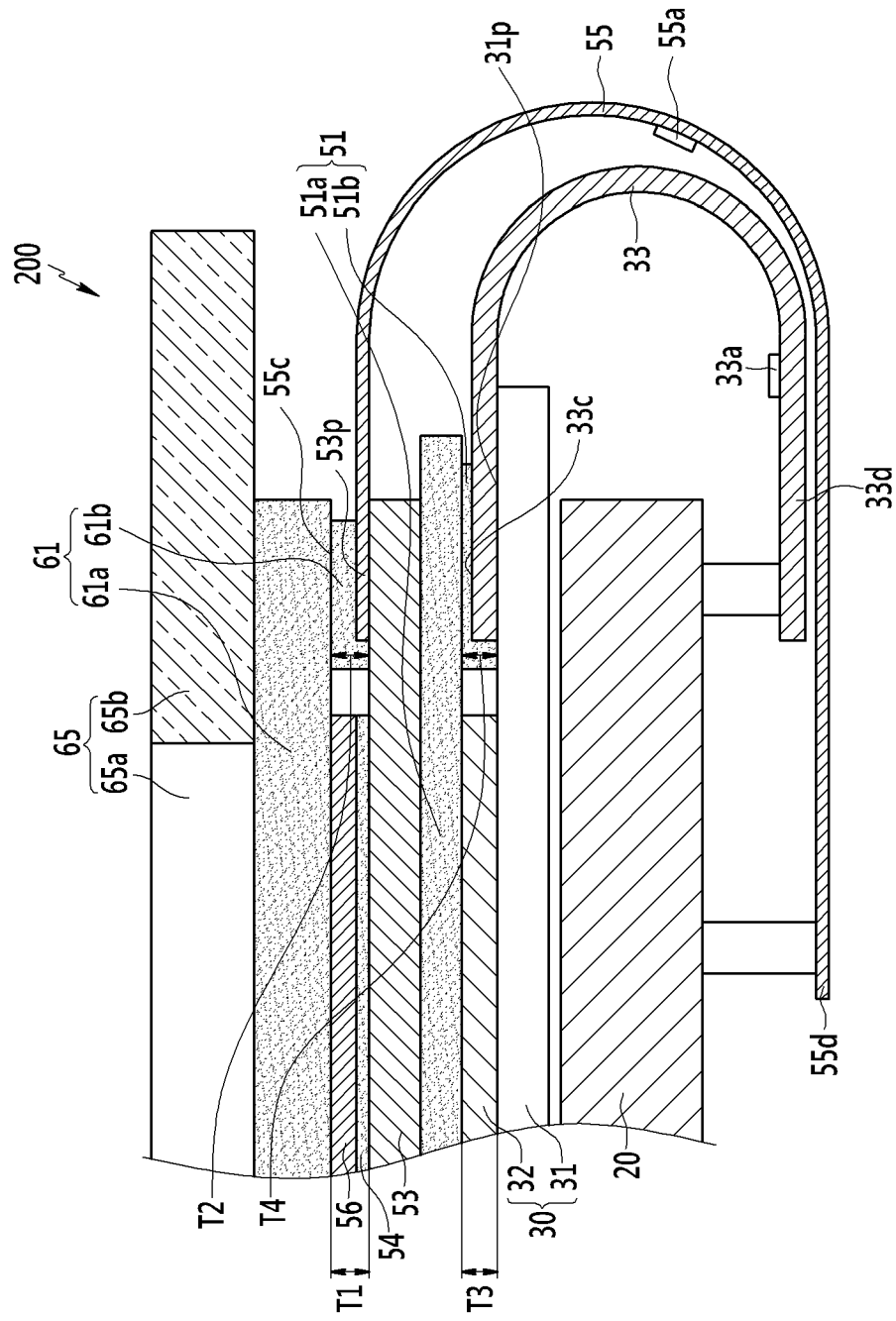
FIG. 6 is a cross-sectional view illustrating an edge portion of a display device at which a pad unit is disposed according to another exemplary embodiment.

As such, it is possible to more strongly secure the TSP connection 55c of the TSP flexible printed circuit board 55 and the pad unit 53p of the touch screen panel 53 to the window substrate 65, thereby improving the effect of preventing penetration of moisture and saline from the outside. The TSP connection part 55c is at the first end of the TSP flexible printed circuit board 55. FIG. 6 is a cross-sectional view illustrating an edge portion of a display device at which a pad unit is disposed according to another exemplary embodiment.

Referring to FIG. 6, in a display device 200 according to the present exemplary embodiment, a TSP adhesive layer 61 includes a TSP main adhesive member 61a and a TSP auxiliary adhesive member 61b, and a display panel adhesive layer 51 includes a display panel main adhesive member 51a and a display panel auxiliary adhesive member 51b.

The TSP main adhesive member 61a is formed to extend from a central portion facing a portion between the touch screen panel 53 and the window substrate 65 to the connection part of the TSP flexible printed circuit board 55, and the TSP auxiliary adhesive member 61b is disposed between the TSP main adhesive member 61a and the TSP connection part 55c of the TSP flexible printed circuit board 55. Accordingly, one surface of the TSP auxiliary adhesive member 61b is attached to the TSP connection part 55c of the TSP flexible printed circuit board 55 and the pad unit 53p of the touch screen panel 53, and another surface of the TSP auxiliary adhesive member 61b is attached to the TSP main adhesive member 61a.

The display panel main adhesive member 51a is formed to extend from a central portion facing a portion between the display panel 31 and the touch screen panel 53 to the connection part of the display panel flexible printed circuit board 33, and the display panel auxiliary adhesive member 51b is formed between the display panel main adhesive member 51a and the display connection part 33c of the display panel flexible printed circuit board 33. Accordingly, one surface of the display panel auxiliary adhesive member 51b is attached to the display connection part 33c of the display panel flexible printed circuit board 33 and the pad unit 31p of the display panel 31, and another surface of the display panel auxiliary adhesive member 51b is attached to the display panel main adhesive member 51a.

In the present exemplary embodiment, when the reinforcement film 56 and the reinforcement film adhesive layer 54 together have a first thickness T1 and the TSP auxiliary adhesive member 61b has a second thickness T2, the first thickness T1 and the second thickness T2 may be substantially the same. In other words, a gap between the touch screen panel 53 and the TSP main adhesive member 61a may be filled with the TSP auxiliary adhesive member 61b, and the pad unit 53p of the touch screen panel 53 may be flatly secured to the window substrate 65.

Similarly, when the optical film 32 has a third thickness T3 and the display panel auxiliary adhesive member 51b has a fourth thickness T4, the first thickness T3 and the second thickness T4 may be substantially the same. In other words, a gap between the display panel 31 and the display panel main adhesive member 51a may be filled with the display panel auxiliary adhesive member 51b, and the pad unit 31p of the display panel 31 may be flatly secured to the touch screen panel 53.

In the present exemplary embodiment, the TSP main adhesive member 61a, the TSP auxiliary adhesive member 61b, the display panel main adhesive member 51a, and the display panel auxiliary adhesive member 51b may be formed of an adhesive tape, or may be formed by curing an adhesive material.

Figure 7:
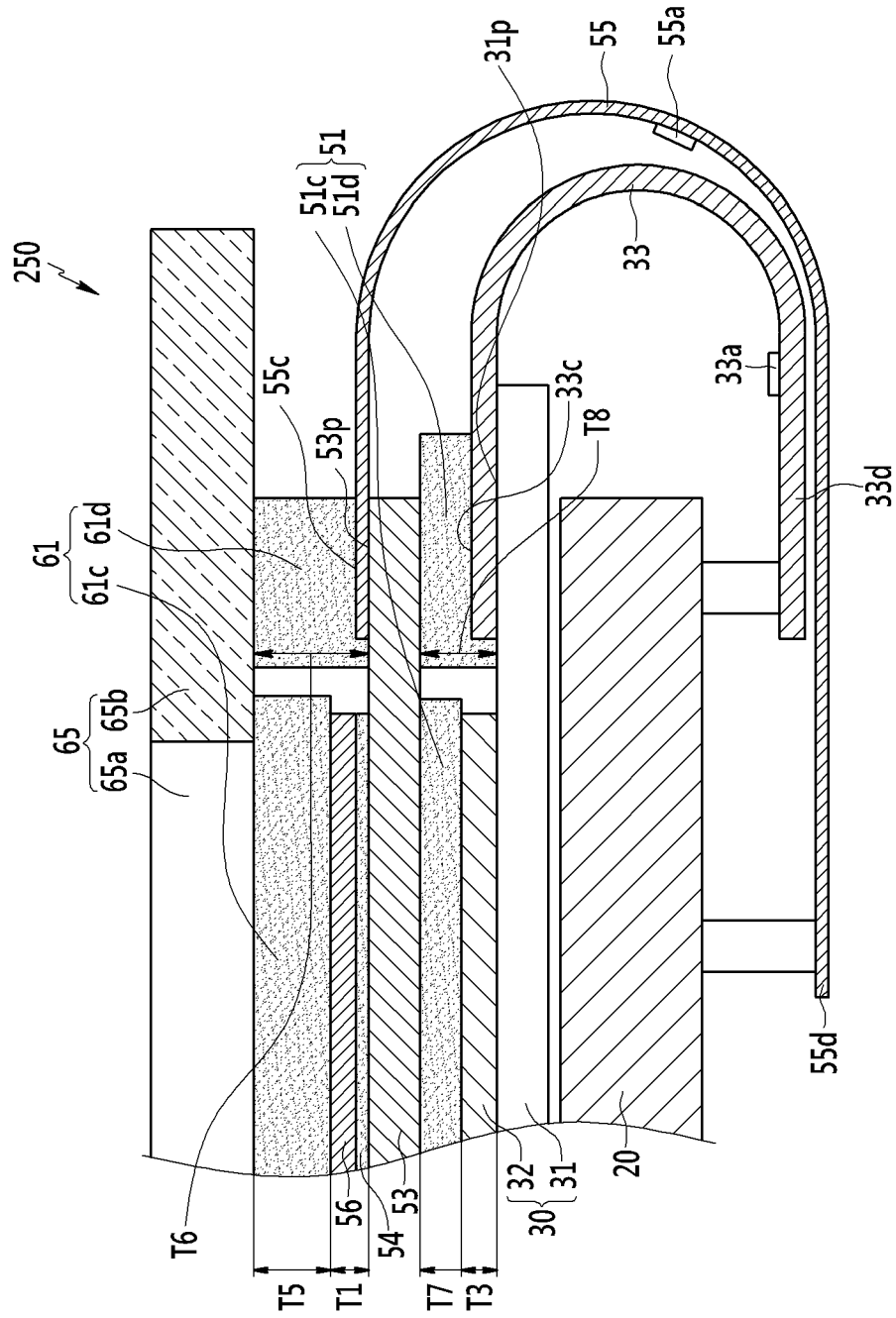
FIG. 7 is a cross-sectional view illustrating an edge portion of a display device at which a pad unit is disposed according to yet another exemplary embodiment.

FIG. 7 is a cross-sectional view illustrating an edge portion of a display device at which a pad unit is disposed according to yet another exemplary embodiment.

Referring to FIG. 7, in a display device 250 according to the present exemplary embodiment, the TSP adhesive layer 61 includes a TSP main adhesive member 61c and a TSP auxiliary adhesive member 61d which are disposed to be separated from each other, and the display panel adhesive layer 51 includes a display panel main adhesive member 51c and a display panel auxiliary adhesive member 51*d* which are disposed to be separated from each other.

The TSP main adhesive member 61*c* is formed to extend from a central portion facing a portion between the touch screen panel 53 and the window substrate 65, and the TSP auxiliary adhesive member 61*d* is separated from the TSP main adhesive member 61*c* and is disposed between the window substrate 65 and the TSP connection part 55*c* of the TSP flexible printed circuit board 55. Accordingly, one surface of the TSP auxiliary adhesive member 61*d* is attached to the TSP connection part 55*c* of the TSP flexible printed circuit board and the pad unit 53*p* of the touch screen panel 53, and another surface of the TSP auxiliary adhesive member 61*b* is attached to the window substrate 65.

The display panel main adhesive member 51*c* is disposed at a central portion facing a portion between the display panel 31 and the touch screen panel 53, and the display panel auxiliary adhesive member 51*d* is separated from the display panel main adhesive member 51*c* and is disposed between the touch screen panel 53 and the display connection part 33*c* of the display panel flexible printed circuit board 33. Accordingly, one surface of the display panel auxiliary adhesive member 51*d* is attached to the display connection part 33*c* of the display panel flexible printed circuit board 33 and the pad unit 31*p* of the display panel 31, and another surface of the display panel auxiliary adhesive member 51*d* is attached to the touch screen panel 53.

In the present exemplary embodiment, the reinforcement film 56 and the reinforcement film adhesive layer 54 together have the first thickness T1, the TSP main adhesive member 61*c* has a fifth thickness T5, and the TSP auxiliary adhesive member 61*d* has a sixth thickness T6, and the sum of the first thickness T1 and the fifth thickness T5 may be substantially the same as the sixth thickness T6. In other words, a gap between the touch screen panel 53 and the window substrate 65 may be filled with the TSP auxiliary adhesive member 61*d*, and the pad unit 53*p* of the touch screen panel 53 may be flatly secured to the window substrate 65.

Similarly, when the optical film 32 has the third thickness T3, the display panel main adhesive member 51*c* has a seventh thickness T7, and the display panel auxiliary adhesive member 51*d* has an eighth thickness T8, the sum of the third thickness T3 and the seventh thickness T7 may be substantially the same as the thickness T8. In other words, a gap between the display panel 31 and the touch screen panel 53 may be filled with the display panel auxiliary adhesive member 51*d*, and the pad unit 31*p* of the display panel 31 may be flatly secured to the touch screen panel 53.

In the present exemplary embodiment, the TSP main adhesive member 61*c*, the TSP auxiliary adhesive member 61*d*, the display panel main adhesive member 51*c*, and the display panel auxiliary adhesive member 51*d* may be formed of an adhesive tape, or may be formed by curing an adhesive material.

Figure 8:
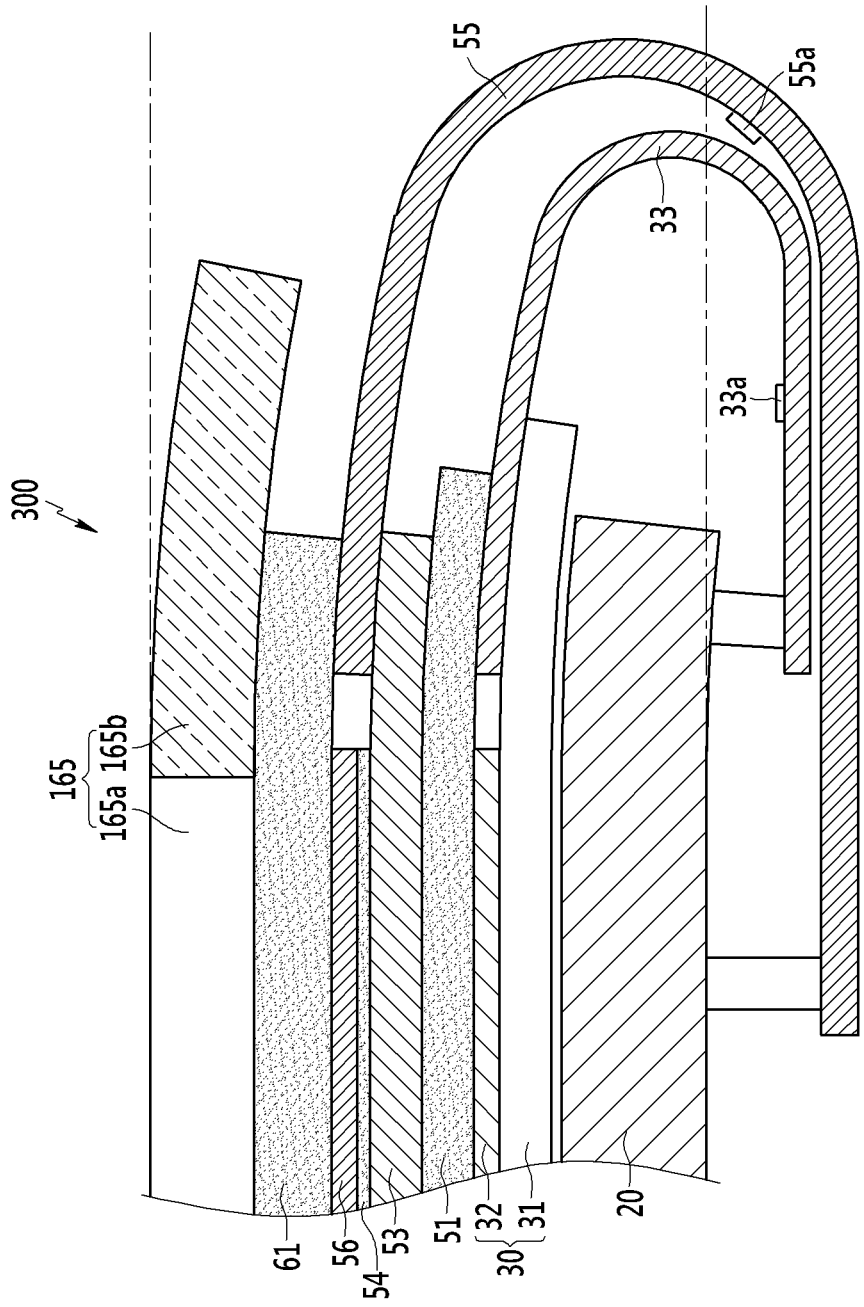
FIG. 8 is a cross-sectional view illustrating an edge portion of a display device at which a pad unit is disposed according to yet another exemplary embodiment.

FIG. 8 is a cross-sectional view illustrating an edge portion of a display device at which a pad unit is disposed according to yet another exemplary embodiment.

In a display device 300 according to the present exemplary embodiment, an edge of a window substrate 165 is formed to have a curved shape, and thus the touch screen panel 53 and the display panel 31 are coupled to the window substrate 165 in a curved form. The window substrate 165 includes a light transmitting portion 165*a* and a light blocking portion 165*b*. The light transmitting portion 165*a* is positioned to correspond to the display area DA (see FIG. 1) of the display panel 31, and the light blocking portion 165*b* is positioned to surround the light transmitting portion 165*a*, and is positioned in the non-display area ND (see FIG. 1) of the display panel 31.

In the present exemplary embodiment, for the window substrate 165, the light blocking portion 165*b* at which the touch screen panel 53 and the display panel 31 are disposed is curvedly formed as it goes to the edge, but it may be curvedly formed even at the light transmitting portion 165*a*.

Figure 9:
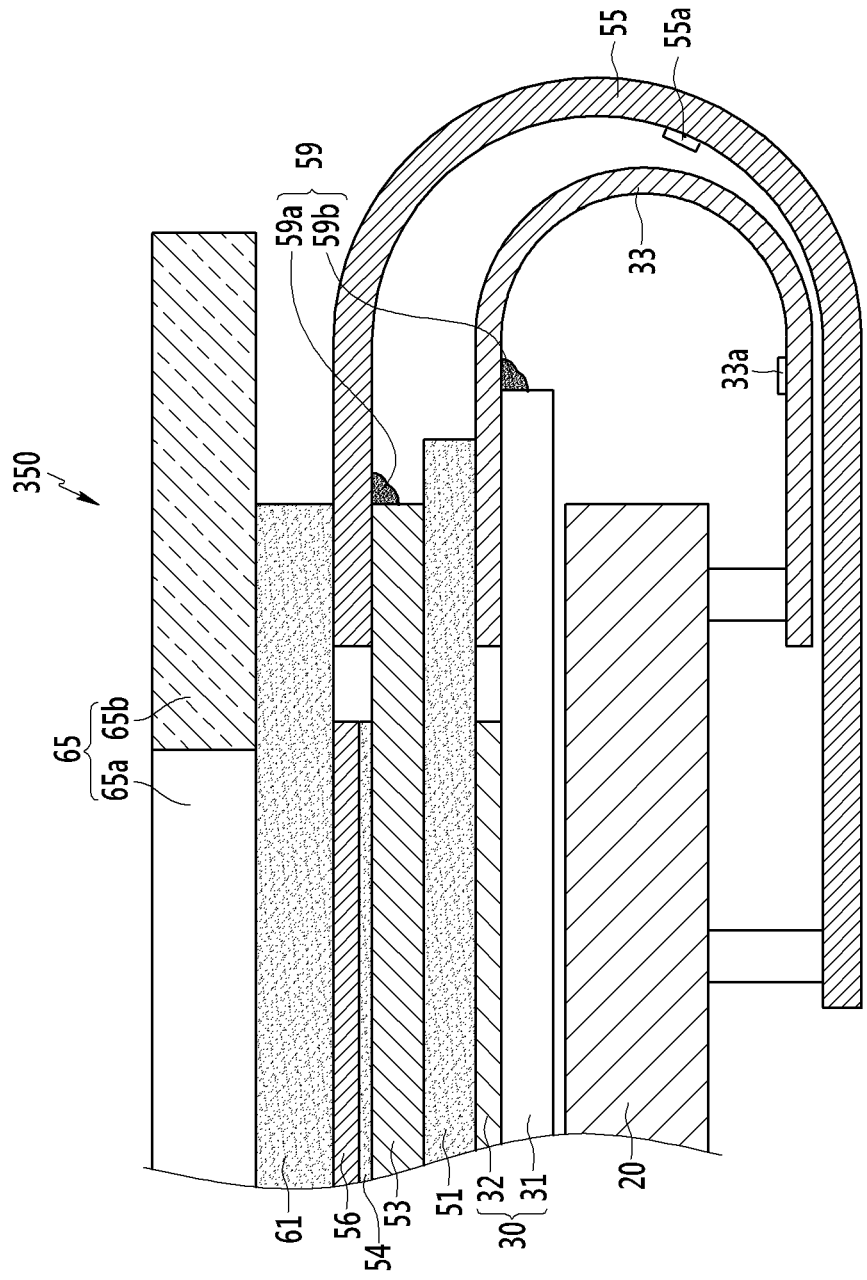
FIG. 9 is a cross-sectional view illustrating an edge portion of a display device at which a pad unit is disposed according to yet another exemplary embodiment.

FIG. 9 is a cross-sectional view illustrating an edge portion of a display device at which a pad unit is disposed according to yet another exemplary embodiment.

A display device 350 according to the present exemplary embodiment has a configuration further including desiccants 59 (59*a* and 59*b*) in addition to the configuration of the display device 100 shown in FIG. 1.

Referring to FIG. 9, the desiccant 59*a* may be coated according to a boundary at which an edge of the touch screen panel 53 contacts the TSP flexible printed circuit board 55. In other words, the desiccant 59*a* may be coated at a corner formed by a bottom surface of the TSP flexible printed circuit board 55 and an end portion of the touch screen panel 53. Further, the desiccant 59*b* may be coated according to a boundary at which an edge of the display panel 31 contacts the display panel flexible printed circuit board 33. In other words, the desiccant 59*b* may be coated at a corner formed by a bottom surface of the display panel flexible printed circuit board 33 and an end portion of the display panel 31.

The desiccants 59 may be coated on target regions by coating a water-repellent coating solution on the target regions by a dispensing process, thereby serving to perform corrosion prevention and insulation.

Figure 10:
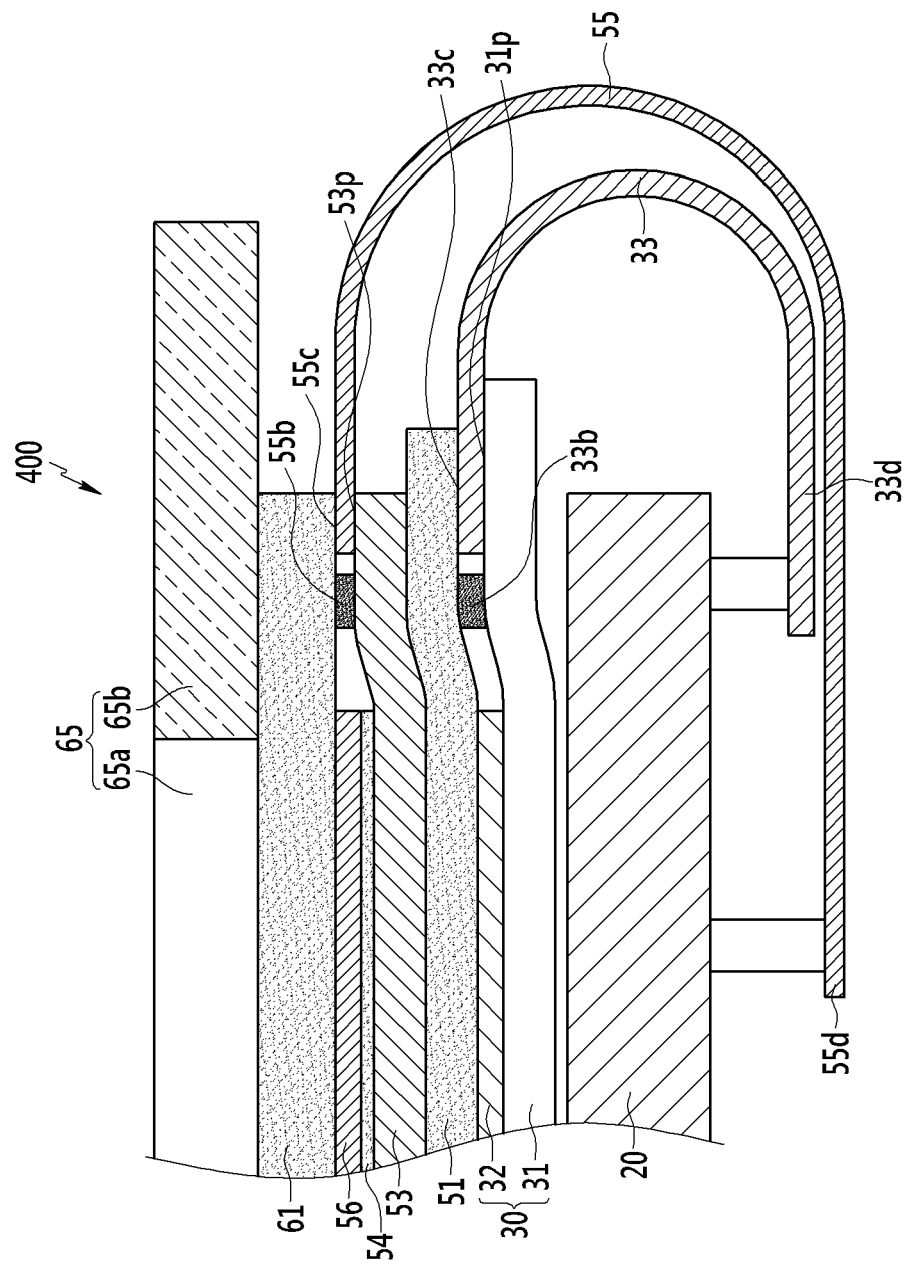
FIG. 10 is a cross-sectional view illustrating an edge portion of a display device at which a pad unit is disposed according to yet another exemplary embodiment.

FIG. 10 is a cross-sectional view illustrating an edge portion of a display device at which a pad unit is disposed according to yet another exemplary embodiment.

Referring to FIG. 10, in a display device 400 according to the present exemplary embodiment, the touch driving integrated circuit 55*b* is mounted in the touch screen panel 53, and the display driving integrated circuit 33*b* is mounted in the display panel 31, unlike in the display device 100 shown in FIG. 2. The touch driving integrated circuit 55*b* is disposed in the pad unit 53*p* of the touch screen panel 53, and may be connected to the TSP connection part 55*c* of the TSP flexible printed circuit board 55 to generate a touch driving signal. The display driving integrated circuit 33*b* is disposed in the pad unit 31*p* of the display panel 31, and may be connected to the display connection part 33*c* of the display panel flexible printed circuit board 33 to generate a display driving signal. The touch driving integrated circuit 55*b* and the display driving integrated circuit 33*b* may be mounted by using a chip on plastic (COP) method.

In the present exemplary embodiment, the TSP adhesive layer 61 can be formed such that the TSP flexible printed circuit board 55 covers the TSP connection part 55*c* connected to the pad unit 53*p* of the touch screen panel 53, and additionally covers the touch driving integrated circuit 55*b*. Similarly, the display panel adhesive layer 51 can be formed such that the display panel flexible printed circuit board 33 covers the display connection part 33*c* connected to the pad unit 31*p* of the display panel 31, and additionally covers the display driving integrated circuit 33*b*.

Experimental Example

Table 1 illustrates a result of defect inspection that was performed by spraying salt water at the display device of the exemplary embodiments shown in FIG. 1 and FIG. 9. In the comparative example, the TSP adhesive layer 61 is configured to not extend up to the TSP flexible printed circuit board 55. In Experimental Example 1, the TSP adhesive layer 61 is configured to extend up to the TSP flexible printed circuit board 55. In Experimental Example 2, the TSP adhesive layer 61 is configured to extend up to the TSP flexible printed circuit board 55, and the desiccants 59 are additionally coated.

TABLE 1

| Division | Comparative Example | Experimental Example 1 | Experimental Example 2 |
|---|---|---|---|
| Defect No./Total No. | 5/18 | 0/20 | 0/20 |
| Defect rate | 27.8% | 0% | 0% |

As shown in Table 1, the comparative example shows inferiority defect rate of about 27.8%, while Experimental Examples 1 and 2 show no defect rate. The "defect rate" is the ratio of defective product to total product.

The display panel that is applied to the display device according to the aforementioned exemplary embodiments and modifications may be formed of a liquid crystal display (LCD), which is included within the spirit and scope of the appended claims. When the display panel is the liquid crystal display, the display device may further include a backlight assembly between the driving circuit board and the display panel. The backlight assembly can output light toward the display panel, and the display panel can display images by using the light outputted from the backlight assembly.

The structures of the TSP adhesive layers of the display devices according to the exemplary embodiments and the modifications can be variously combined with each other, which is included within the spirit and scope of the appended claims.

Further, in the TSP adhesive layer and the display panel adhesive layer of the display device according to the exemplary embodiments or the modifications shown in FIG. 2 and FIG. 6 to FIG. 8, the touch driving integrated circuit or the display driving integrated circuit may be mounted in the display panel, which is included within the spirit and scope of the appended claims.

In addition, in the display device according to the exemplary embodiments or the modifications shown in FIG. 4 to FIG. 8, the desiccant may be selectively coated, which is included within the spirit and scope of the appended claims.

While this disclosure has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

20: driving circuit board
30: display panel assembly
31: display panel
32: optical film
33: display panel flexible printed circuit board (FPCB)
33a, 33b: display driving integrated circuit (IC)
51: display panel adhesive layer
53: touch screen panel (TSP)
55a, 55b: touch driving integrated circuit
51a, 51c: display panel main adhesive member
51b, 51d: display panel auxiliary adhesive member
54: reinforcement film adhesive layer
55: TSP flexible printed circuit board (FPCB)
56: reinforcement film
59: desiccant
61: TSP adhesive layer
65, 165: window substrate
61a, 61c: TSP main adhesive member
61b, 61d: TSP auxiliary adhesive member
65a, 165a: light transmitting portion
65b, 165b: light blocking portion
100, 110, 200, 250, 300, 400: display device

What is claimed is:

1. A display device comprising:
a display panel configured to display an image, the display panel including a first pad unit;
a touch screen panel (TSP) attached to an upper portion of the display panel, the touch screen panel including a second pad unit;
a first flexible printed circuit board configured to include a first connection part that is connected to the second pad unit of the touch screen panel and overlaps the second pad unit;
a window substrate configured to cover the touch screen panel; and
a first adhesive layer interposed between the touch screen panel and the window substrate to adhere the window substrate to the touch screen panel,
wherein:
the first adhesive layer includes a portion which is interposed between the window substrate and the first connection part, the portion at least partially covers the first connection part;
a reinforcement film is interposed between the touch screen panel and the window substrate;
the reinforcement film does not contact the window substrate; and
an optical film including a polarization film is interposed between the display panel and the touch screen panel.

2. The display device of claim 1, wherein the first connection part is secured to the window substrate by the first adhesive layer.

3. The display device of claim 1, wherein the first adhesive layer is formed to extend from a central portion facing a portion between the touch screen panel and the window substrate, to cover the first connection part.

4. The display device of claim 1, wherein the first adhesive layer further includes an auxiliary TSP adhering member having one surface attached to at least one of the first connection part and the second pad unit, and another surface that is attached to the first adhesive layer.

5. The display device of claim 1, wherein the first adhesive layer further includes an auxiliary TSP adhering member having one surface attached to at least one of the first connection part and the second pad unit, and another surface that is attached to the window substrate.

6. The display device of claim 1, wherein the first adhesive layer is disposed to protrude from a boundary of an edge of the touch screen panel to cover a portion of the first flexible printed circuit board that is adjacent to the first connection part.

7. The display device of claim 6, wherein the portion of the first flexible printed circuit board that is adjacent to the first connection part is secured to the window substrate by the first adhesive layer.

8. The display device of claim 1, wherein a touch driving integrated circuit is mounted on the touch screen panel, and the first adhesive layer is formed to cover the touch driving integrated circuit.

9. The display device of claim 1, wherein the first adhesive layer is formed of an optically clear adhesive (OCA).

10. The display device of claim 1, wherein an area of optical film is smaller than an area of the display panel.

11. The display device of claim 1, wherein the first adhesive layer is interposed between the reinforcement film and the window substrate to adhere the window substrate to the reinforcement film.

12. The display device of claim 11, wherein the reinforcement film has an area that is smaller than an area of the touch screen panel and the window substrate, a boundary of at least one side of the reinforcement film is positioned at a more inner side than a boundary of the touch screen panel, and the first flexible printed circuit board is connected to an edge of the touch screen panel adjacent to the reinforcement film.

13. The display device of claim 12, wherein the first adhesive layer is formed to extend over a boundary of the reinforcement film, to cover the first connection part.

14. The display device of claim 1, wherein a second adhesive layer is interposed between the reinforcement film and the touch screen panel to attach the reinforcement film to the touch screen panel.

15. The display device of claim 1, further comprising:

a second flexible printed circuit board configured to include a second connection part that is connected to the first pad unit; and a third adhesive layer interposed between the optical film and the touch screen panel, wherein the third adhesive layer is formed such that the third adhesive layer at least partially covers the second connection part.

16. The display device of claim 15, wherein the second connection part is secured to the touch screen panel by the third adhesive layer.

17. The display device of claim 15, wherein the third adhesive layer is formed to extend from a central portion facing a portion between the touch screen panel and the window substrate, to cover the second connection part.

18. The display device of claim 15, wherein the third adhesive layer further includes an auxiliary display panel adhering member having one surface attached to at least one of the second connection part and the first pad unit, and another surface that is attached to the third adhesive layer.

19. The display device of claim 15, wherein the third adhesive layer further includes an auxiliary display panel adhering member having one surface attached to at least one of the second connection part and the first pad unit, and another surface that is attached to the touch screen panel.

20. The display device of claim 15, wherein a display driving integrated circuit is mounted on the display panel, and the third adhesive layer is formed to cover the display driving integrated circuit.

* * * * *